(12) United States Patent
Taguchi

(10) Patent No.: US 10,760,614 B2
(45) Date of Patent: Sep. 1, 2020

(54) BEARING DEVICE

(71) Applicant: HONDA MOTOR CO., LTD., Tokyo (JP)

(72) Inventor: Shu Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/262,360

(22) Filed: Jan. 30, 2019

(65) Prior Publication Data
US 2019/0234458 A1 Aug. 1, 2019

(30) Foreign Application Priority Data
Feb. 1, 2018 (JP) .................................. 2018-16782

(51) Int. Cl.
*F16C 27/04* (2006.01)
*F01D 25/16* (2006.01)
*F16C 19/06* (2006.01)

(52) U.S. Cl.
CPC .......... *F16C 27/045* (2013.01); *F01D 25/164* (2013.01); *F16C 19/06* (2013.01); *F16C 2360/23* (2013.01)

(58) Field of Classification Search
CPC .... F16C 27/045; F16C 19/06; F16C 2360/23; F01D 25/164; F05D 2240/50; F05D 2240/52; F05D 2240/54
See application file for complete search history.

(56) References Cited

U.S. PATENT DOCUMENTS

| | | | | | |
|---|---|---|---|---|---|
| 4,553,855 | A | * | 11/1985 | De Choudhury | F16O 27/02 384/215 |
| 4,952,076 | A | * | 8/1990 | Wiley, III | F01D 25/164 384/535 |
| 4,971,457 | A | * | 11/1990 | Carlson | F01D 25/164 384/581 |
| 4,971,458 | A | * | 11/1990 | Carlson | F01D 25/164 384/581 |
| 4,981,415 | A | * | 1/1991 | Marnnol | F01D 25/164 384/215 |
| 5,169,241 | A | * | 12/1992 | Singh | F01D 25/164 384/581 |

(Continued)

FOREIGN PATENT DOCUMENTS

JP 2000-145768 5/2000
WO WO2014000797 A1 * 1/2014

*Primary Examiner* — Alan B Waits
(74) *Attorney, Agent, or Firm* — Rankin, Hill & Clark LLP

(57) ABSTRACT

In a bearing device, a squeeze film damper includes an annular oil chamber forming an oil film between an outer periphery of an outer race and an inner periphery of a bearing retaining member. A film thickness adjustment portion adjusting a film thickness of the oil film is provided in at least one location in a peripheral direction of the oil chamber. Therefore, it is possible, by changing a distribution in a peripheral direction of dynamic characteristics of the oil film of the squeeze film damper with a simple structure to thus freely adjust a forward mode tendency or a backward mode tendency for centrifugal whirling, to enhance damping performance of the squeeze film damper. Accordingly, centrifugal whirling of a rotating shaft is suppressed effectively by the squeeze film damper with a simple structure.

5 Claims, 7 Drawing Sheets

(56) References Cited

U.S. PATENT DOCUMENTS

| | | | | |
|---|---|---|---|---|
| 5,207,511 A * | 5/1993 | Bobo | .................... | F01D 25/164 384/581 |
| 5,251,985 A * | 10/1993 | Monzel | .................... | F16F 1/32 384/99 |
| 5,344,239 A * | 9/1994 | Stallone | ................ | F01D 25/164 384/99 |
| 6,135,639 A * | 10/2000 | Dede | .................... | F16O 27/045 384/581 |
| 6,325,546 B1 * | 12/2001 | Storace | .................. | F01D 21/04 384/536 |
| 2002/0136473 A1 * | 9/2002 | Mollmann | ............ | F01D 25/164 384/99 |
| 2003/0189382 A1 * | 10/2003 | Tornquist | ............... | F16O 25/08 310/90 |
| 2004/0022463 A1 * | 2/2004 | Dusserre-Telmon | ........................ F16C 27/045 | 384/99 |
| 2007/0086685 A1 * | 4/2007 | Klusman | ............... | F01D 25/125 384/99 |
| 2008/0056633 A1 * | 3/2008 | Stout | ....................... | F16O 23/04 384/535 |
| 2008/0166076 A1 * | 7/2008 | Stout | ....................... | F16C 27/04 384/99 |
| 2009/0103846 A1 * | 4/2009 | Faust | ..................... | F16C 27/04 384/535 |
| 2009/0110572 A1 * | 4/2009 | Meacham | ................ | F02C 6/12 417/406 |
| 2011/0058759 A1 * | 3/2011 | Herborth | ............... | F01D 25/164 384/55 |
| 2011/0064340 A1 * | 3/2011 | Duong | .................. | F16C 27/045 384/99 |
| 2012/0328226 A1 * | 12/2012 | Gloeckner | ............ | F16C 27/045 384/476 |
| 2015/0300406 A1 * | 10/2015 | Freeman | ............. | F16F 15/0237 416/174 |
| 2016/0040554 A1 * | 2/2016 | Hovhannisian | ..... | F16C 33/6659 415/170.1 |
| 2016/0160924 A1 * | 6/2016 | Meyers | ................. | F01D 25/164 384/474 |
| 2017/0114831 A1 * | 4/2017 | Snow | .................... | F01D 25/162 |
| 2017/0248033 A1 * | 8/2017 | Moniz | ...................... | F02C 3/067 |
| 2017/0335767 A1 * | 11/2017 | Gysling | .................... | F02C 7/06 |
| 2018/0245631 A1 * | 8/2018 | Nakayama | ........... | F01D 25/183 |
| 2018/0266274 A1 * | 9/2018 | MacFarlane | ......... | F01D 25/164 |

* cited by examiner

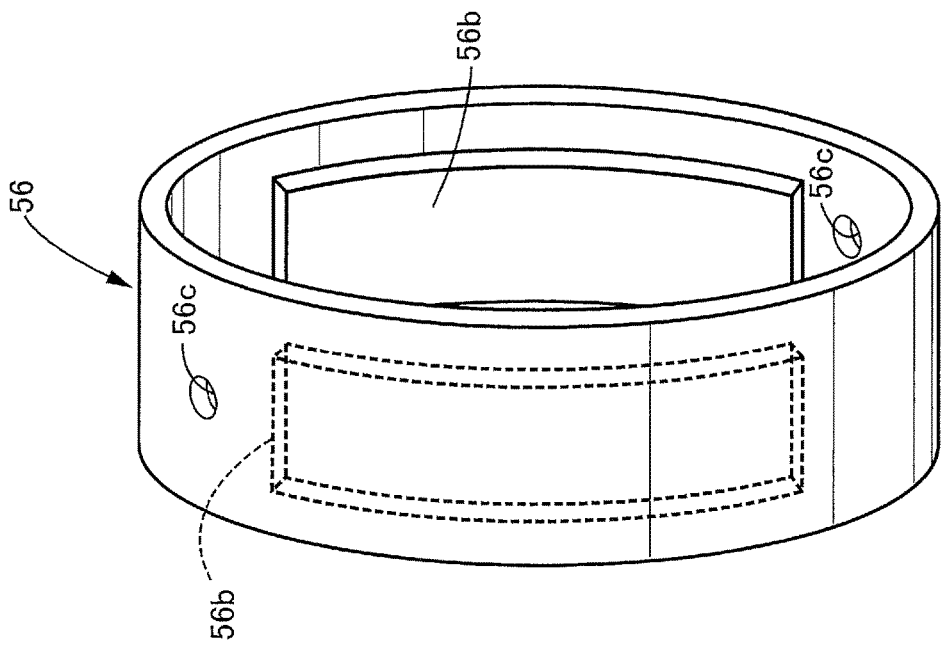
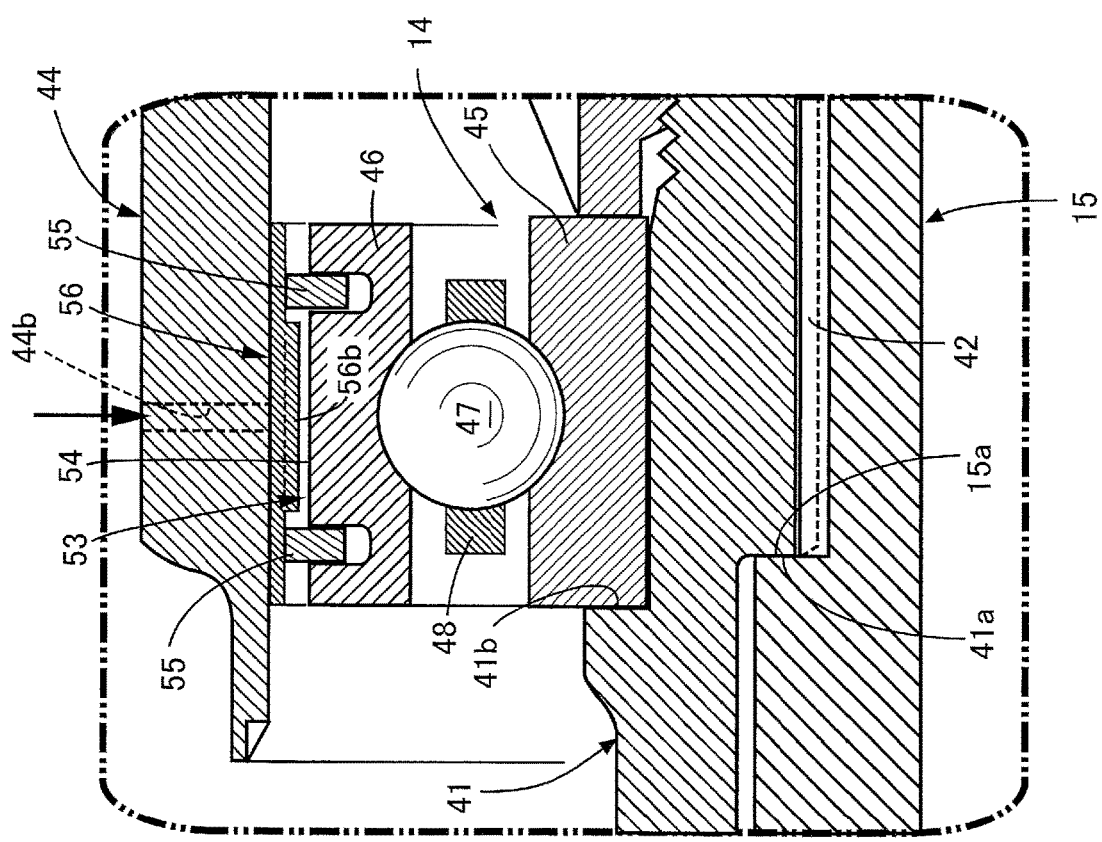

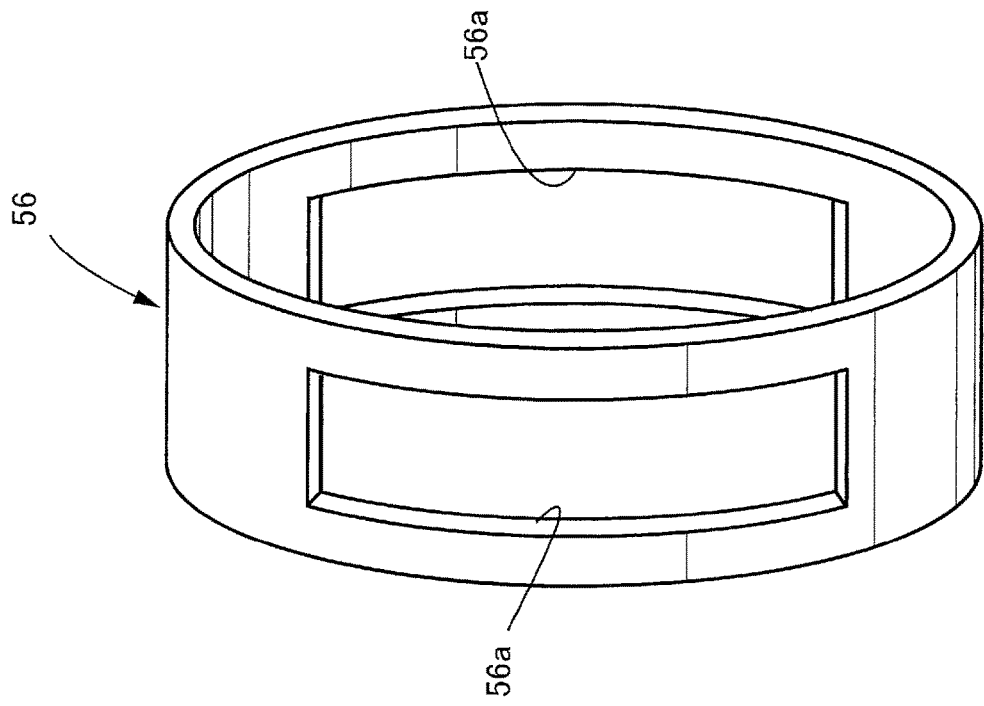
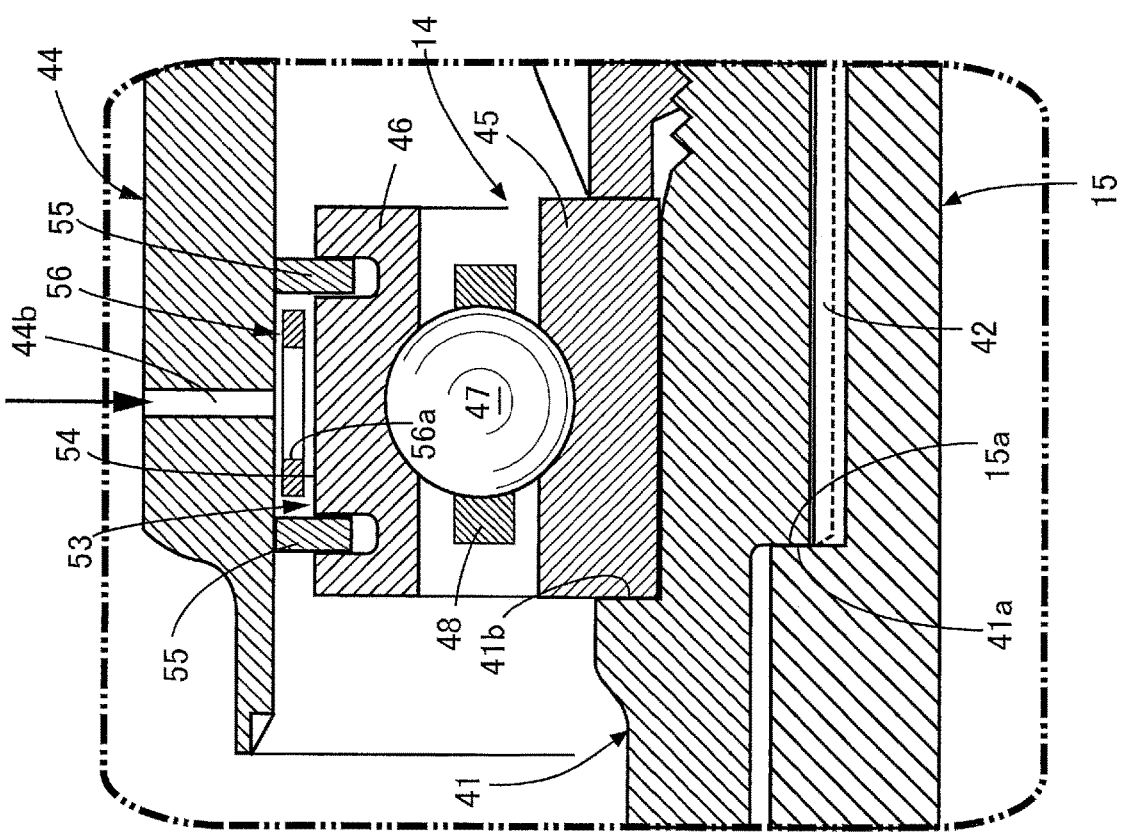

PART HAVING HIGH RIGIDITY DUE TO REDUCTION IN FILM THICKNESS

PART HAVING HIGH RIGIDITY DUE TO REDUCTION IN FILM THICKNESS

BEARING DEVICE

CROSS REFERENCE TO RELATED APPLICATIONS

The present application claims priority under 35 U.S.C. § 119 to Japanese Patent Application No. 2018-16782 filed Feb. 1, 2018 the entire contents of which are hereby incorporated by reference.

BACKGROUND OF THE INVENTION

Field of the Invention

The present invention relates to a bearing device comprising an inner race fitted around an outer periphery of a rotating shaft, an outer race supported on an inner periphery of a bearing retaining member via a squeeze film damper, and a plurality of rolling bodies disposed between the inner race and the outer race.

Description of the Related Art

A bearing device equipped with such a squeeze film damper has a restriction on the oil film thickness of a squeeze film that can give an effective vibration attenuation effect, and when a rotating shaft moves in the radial direction in response to the input of a large vibration load and the oil film thickness of the squeeze film becomes too small, there is the problem that the oil film becomes rigid and an effective vibration attenuation effect cannot be obtained. In order to prevent the oil film from becoming rigid, if the oil film thickness of the squeeze film is set to be large in advance, there is the problem that not only is it not possible to obtain an effective vibration attenuation effect, but also the rotating shaft easily undergoes centrifugal whirling due to vibration.

An arrangement in which the voltage of a plurality of electrodes disposed along the outer periphery of a bearing metal is controlled using a voltage control device, a fluid whose viscosity is changed by the application of a voltage is used as oil for a squeeze film, and the viscosity of the oil is increased in a portion of the squeeze film whose oil film thickness is decreased due to centrifugal whirling of a rotating shaft, thus suppressing the centrifugal whirling of the rotating shaft and reducing the vibration, is known from Japanese Patent Application Laid-open No. 2000-145768.

However, when imbalance occurs in a rotating shaft of for example a gas turbine engine rotating at high speed or the rotating shaft is subjected to an external disturbance, a centrifugal whirling phenomenon in which the rotating shaft revolves while rotating might occur, thus causing a large vibration. With regard to centrifugal whirling of the rotating shaft, there are a forward mode in which the direction of centrifugal whirling is the same as the direction of rotation of the rotating shaft and a backward mode in which the direction of centrifugal whirling is opposite to the direction of rotation of the rotating shaft, and whether it becomes the forward mode or the backward mode is determined by the inherent characteristics of the gas turbine engine. When the rotating shaft is supported via a squeeze film damper, it is possible, by making the dynamic characteristics distribution uniform in the peripheral direction of the squeeze film damper to thus impart isotropy or by making it non-uniform to impart anisotropy, to freely adjust the forward mode tendency or the backward mode tendency, thus enabling centrifugal whirling of the rotating shaft to be suppressed.

In the arrangement described in Japanese Patent Application Laid-open No. 2000-145768, it is possible by controlling the voltage of the plurality of electrodes to change the dynamic characteristics distribution in the peripheral direction of the squeeze film damper, but since it is necessary to provide the plurality of electrodes and a voltage control device or use a special oil, there is the problem that the device increases in dimensions, the weight increases, and the cost rises, etc.

SUMMARY OF THE INVENTION

The present invention has been accomplished in light of the above circumstances, and it is an object thereof to suppress effectively centrifugal whirling of a rotating shaft by means of a squeeze film damper with a simple structure.

In order to achieve the object, according to a first aspect of the present invention, there is provided a bearing device comprising an inner race fitted around an outer periphery of a rotating shaft, an outer race supported on an inner periphery of a bearing retaining member via a squeeze film damper, and a plurality of rolling bodies disposed between the inner race and the outer race, the squeeze film damper comprising an annular oil chamber forming an oil film between an outer periphery of the outer race and the inner periphery of the bearing retaining member, and a film thickness adjustment portion adjusting a film thickness of the oil film being provided in at least one location in a peripheral direction of the oil chamber.

In accordance with the first aspect, since the bearing device includes the inner race fitted around the outer periphery of the rotating shaft, the outer race supported on the inner periphery of the bearing retaining member via the squeeze film damper, and the plurality of rolling bodies disposed between the inner race and the outer race, the vibration generated by the rotating shaft undergoing centrifugal whirling due to imbalance of the weight is damped by the squeeze film damper during the process of being transmitted from the outer race to the bearing retaining member.

Since the squeeze film damper includes the annular oil chamber forming the oil film between the outer periphery of the outer race and the inner periphery of the bearing retaining member, and the film thickness adjustment portion adjusting the film thickness of the oil film is provided in at least one location in the peripheral direction of the oil chamber, it is possible, by changing the distribution in the peripheral direction of the dynamic characteristics of the oil film of the squeeze film damper with a simple structure to thus freely adjust the forward mode tendency or the backward mode tendency for centrifugal whirling, to enhance the damping performance of the squeeze film damper.

According to a second aspect of the present invention, in addition to the first aspect, the film thickness adjustment portion is a recess portion formed in the inner periphery of the bearing retaining member.

In accordance with the second aspect, since the film thickness adjustment portion is a recess portion formed in the inner periphery of the bearing retaining member, it is possible to provide the film thickness adjustment portion without increasing the number of components.

According to a third aspect of the present invention, in addition to the first aspect, the film thickness adjustment portion is a recess portion or a projecting portion formed on a ring member fixed to the inner periphery of the bearing retaining member.

In accordance with the third aspect, since the film thickness adjustment portion is the recess portion or the projecting portion formed on the ring member fixed to the inner periphery of the bearing retaining member, it is possible to provide the film thickness adjustment portion without carrying out troublesome machining of the inner periphery of the bearing retaining member.

According to a fourth aspect of the present invention, in addition to the first aspect, the film thickness adjustment portion is a recess portion or a projecting portion formed on a ring member disposed in an interior of the oil chamber in a floating state.

In accordance with the fourth aspect, since the film thickness adjustment portion is the recess portion or the projecting portion formed on the ring member disposed in the interior of the oil chamber in a floating state, not only is it unnecessary to carry out troublesome machining of the inner periphery of the bearing retaining member, but assembly of the ring member also becomes easy.

According to a fifth aspect of the present invention, in addition to any one of the first to fourth aspects, the film thickness adjustment portion is provided in two locations, spaced by 180° in the peripheral direction, of the oil chamber.

In accordance with the fifth aspect, since the film thickness adjustment portion is provided in two locations spaced by 180° in the peripheral direction of the oil chamber, it is possible to maximize the anisotropy of the film thickness of the oil film, thus enhancing the damping effect.

According to a sixth aspect of the present invention, in addition to the fifth aspect, the rotating shaft is disposed in a horizontal direction, and the film thickness adjustment portion is provided in two locations spaced in a vertical direction of the oil chamber or in two locations spaced in the horizontal direction.

In accordance with the sixth aspect, since the rotating shaft is disposed in the horizontal direction, and the film thickness adjustment portion is provided in two locations spaced in the vertical direction of the oil chamber or in two locations spaced in the horizontal direction, it is possible to freely adjust the forward mode tendency or the backward mode tendency for centrifugal whirling of the rotating shaft.

Note that a sleeve 41 of embodiments corresponds to the rotating shaft of the present invention, recess portions 44a and 56a and projecting portions 56b of the embodiments correspond to the film thickness adjustment portion of the present invention, and balls 47 of the embodiments correspond to the rolling bodies of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIGS. 5A and 5B are views corresponding to FIG. 2 (third embodiment).

FIGS. 6A and 6B are views corresponding to FIG. 2 (fourth embodiment).

DESCRIPTION OF THE PREFERRED EMBODIMENTS

First Embodiment

A first embodiment the present invention is explained below by reference to FIG. 1 to FIG. 3.

Figure 1:
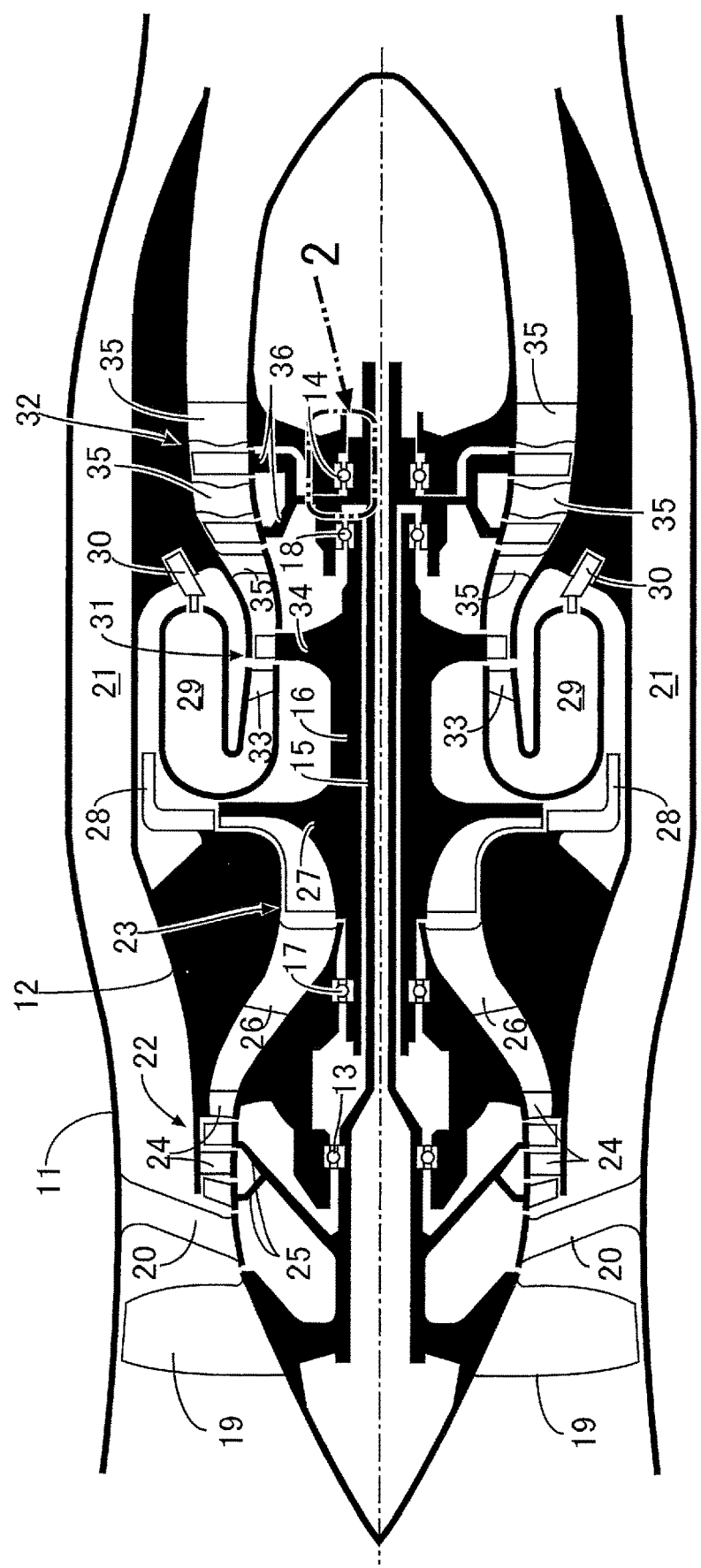
FIG. 1 is a view showing an entire structure of a gas turbine engine (first embodiment).

As shown in FIG. 1, a gas turbine engine for an airplane to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

Fixed to the front end of the low pressure system shaft 15 is a front fan 19 having its blade tip facing an inner face of the outer casing 11, and part of the air sucked in by the front fan 19 passes through a stator vane 20 disposed between the outer casing 11 and the inner casing 12; part thereof then passes through an annular bypass duct 21 formed between the outer casing 11 and the inner casing 12 and is jetted rearward, and another part is supplied to an axial low pressure compressor 22 and a centrifugal high pressure compressor 23 disposed in the interior of the inner casing 12.

The low pressure compressor 22 includes a stator vane 24 fixed to the interior of the inner casing 12 and a low pressure compressor wheel 25 equipped with a compressor blade on the outer periphery and fixed to the low pressure system shaft 15. The high pressure compressor 23 includes a stator vane 26 fixed to the interior of the inner casing 12 and a high pressure compressor wheel 27 equipped with a compressor blade on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed and combusted in the interior of the reverse flow combustion chamber 29, and the combustion gas thus generated is supplied to a high pressure turbine 31 and a low pressure turbine 32.

The high pressure turbine 31 includes a nozzle guide vane 33 fixed to the interior of the inner casing 12, and a high pressure turbine wheel 34 equipped with a turbine blade on the outer periphery and fixed to the high pressure system shaft 16. The low pressure turbine 32 includes a nozzle guide vane 35 fixed to the interior of the inner casing 12, and a low pressure turbine wheel 36 equipped with a turbine blade on the outer periphery and fixed to the low pressure system shaft 15.

Therefore, when the high pressure system shaft 16 is driven by a starter motor, which is not illustrated, air sucked in by the high pressure compressor wheel 27 is supplied to the reverse flow combustion chamber 29, mixed with fuel, and combusted, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, the operation of the gas turbine engine thus continuing even when the starter motor is stopped.

While the gas turbine engine is operating, part of the air sucked in by the front fan 19 passes through the bypass duct 21 and is jetted rearward, thus generating the main thrust at a time of low speed flying in particular. The rest of the air sucked in by the front fan 19 is supplied to the reverse flow combustion chamber 29, mixed with fuel, combusted to thus drive the low pressure system shaft 15 and the high pressure system shaft 16, and then jetted rearward to generate thrust.

The structure of the periphery of the rear first bearing 14 is now explained by reference to FIG. 2 and FIG. 3.

Figure 2:
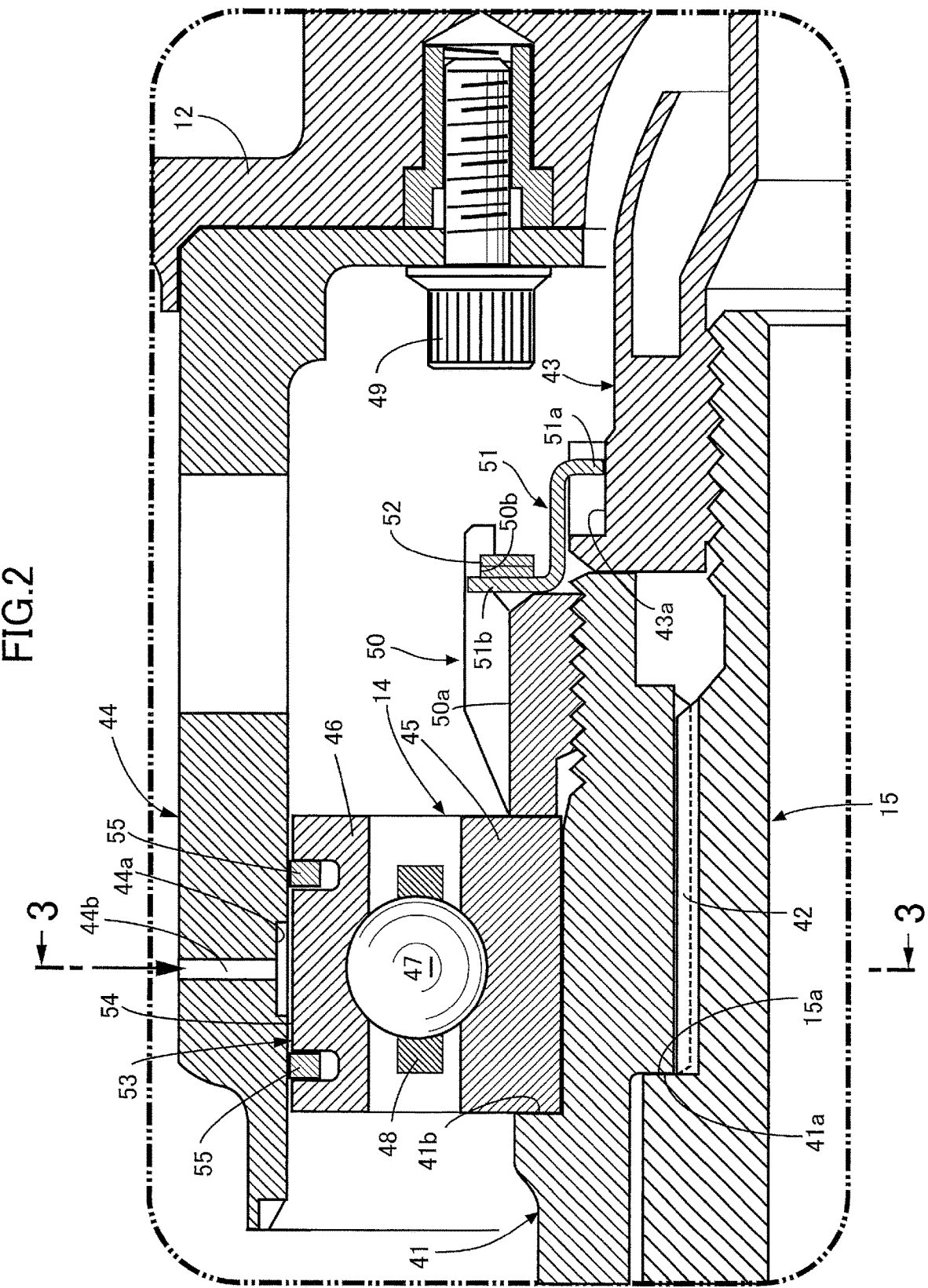
FIG. 2 is an enlarged view of portion 2 in FIG. 1 (first embodiment).
Figure 3:
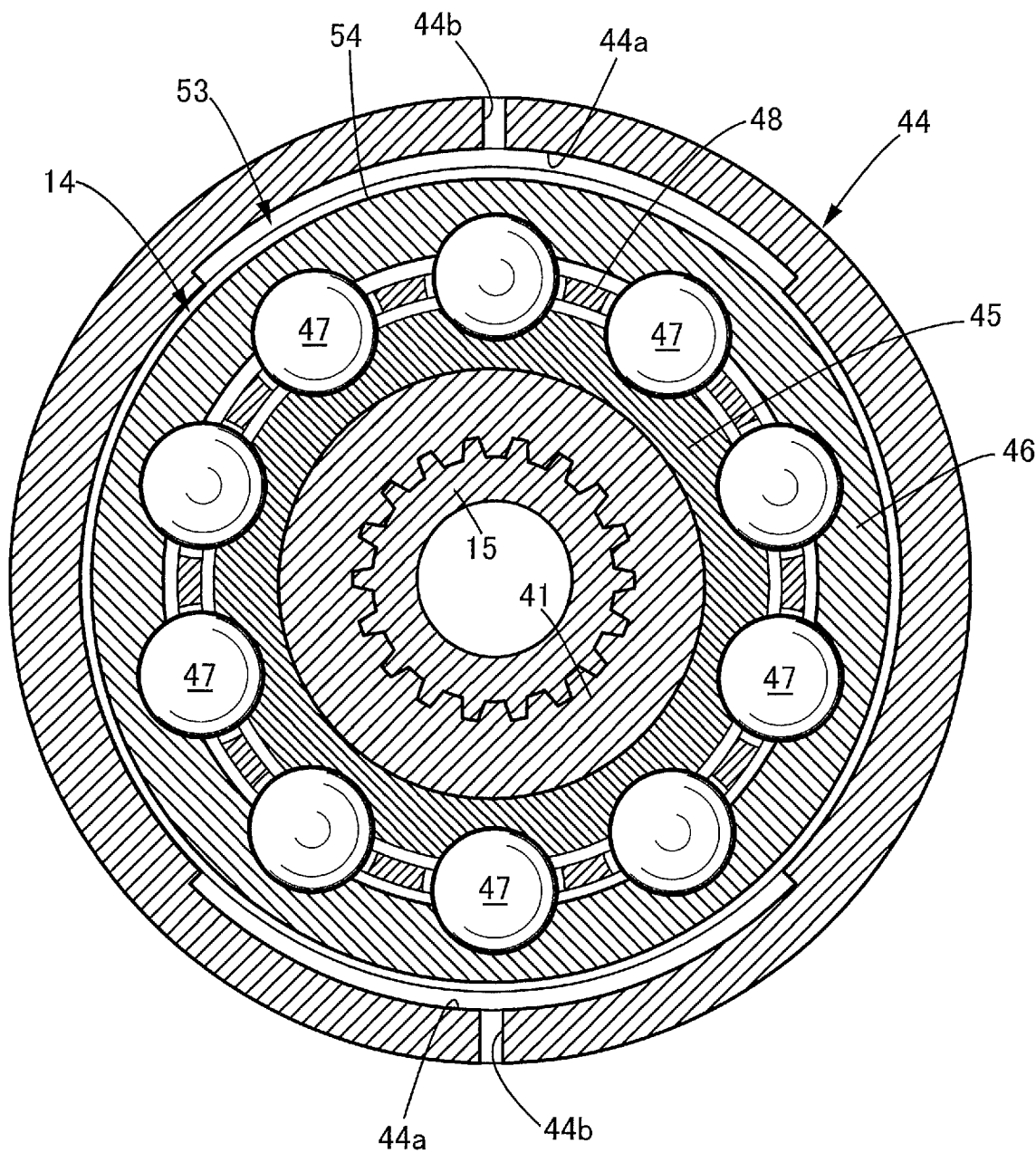
FIG. 3 is a sectional view along line 3-3 in FIG. 2 (first embodiment).

A sleeve 41 for supporting the low pressure turbine wheel 36 is spline fitted around the outer periphery of the low pressure system shaft 15 by a spline fitting 42, and the sleeve 41 is fastened to the low pressure system shaft 15 by screwing a first nut member 43 around the outer periphery of a shaft end of the low pressure system shaft 15, pushing the sleeve 41 leftward in FIG. 2, and pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 retained by the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The inner race 45 is urged leftward in FIG. 2 by means of a second nut member 50 screwed around the outer periphery of an end part of the sleeve 41 and is fastened by being pressed against a step portion 41b formed on the outer periphery of the sleeve 41. The bearing retaining member 44 is integrally fastened to the inner casing 12 by means of bolts 49.

The directions in which the first nut member 43 and the second nut member 50 are screwed are set to be opposite to each other. That is, when the first nut member 43 is a right-hand screw the second nut member 50 is a left-hand screw, and when the first nut member 43 is a left-hand screw the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projection portions 51a that are disposed at intervals of 180° in the circumferential direction and can engage with the first groove portions 43a of the first nut member 43, and three second projection portions 51b that are disposed at intervals of 120° in the circumferential direction and can engage with the second groove portions 50a of the second nut member 50.

A ring spring 52 that makes the linking member 51 latch onto the second nut member 50 is formed by winding a flat resilient metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite from each other, when the first nut member 43 rotates in a loosening direction, the rotation acts on the second nut member 50 via the linking member 51 in a direction that tightens it, and it thus prevents both the first nut member 43 and the second nut member 50 from becoming loosened. Conversely, when the second nut member 50 attempts to rotate in a loosening direction, since the rotation acts on the first nut member 43 via the linking member 51 in a direction that tightens it, both the first nut member 43 and the second nut member 50 are prevented from loosening at the same time.

A squeeze film damper 53 provided on the rear first bearing 14 supporting the rear part of the low pressure system shaft 15 via the sleeve 41 includes an annular oil chamber 54 formed between the outer periphery of the outer race 46 and the inner periphery of the bearing retaining member 44, and opposite end parts in the axial direction of the oil chamber 54 are sealed by mans of a pair of seal rings 55. Recess portions 44a are formed at two positions, with phases displaced by 180°, of the inner periphery of the bearing retaining member 44 facing the oil chamber 54. Oil sucked in by an oil pump, which is not illustrated, is supplied to the oil chamber 54 via oil holes 44b extending through the bearing retaining member 44.

The operation of the embodiment of the present invention having the above arrangement is now explained.

When for example the front fan 19 fixed to the low pressure system shaft 15 becomes bent and broken for some reason, the low pressure system shaft 15 and the sleeve 41 undergo centrifugal whirling due to weight imbalance, and vibrate. This vibration is transmitted from the rear first bearing 14 to the squeeze film damper 53 and damped, thus preventing any damage to the inner casing 12 due to the vibration.

That is, when oil is supplied from the oil pump, which is not illustrated, to the oil chamber 54 of the squeeze film damper 53 via the recess portions 44a of the bearing retaining member 44, a squeeze film made of a thin oil film is formed in the oil chamber 54. When the low pressure system shaft 15 vibrates in the radial direction during operation of the gas turbine engine, the vibration is transmitted to the outer race 46 of the rear first bearing 14 having the inner race 45 supported on the sleeve 41, which is integrated with the low pressure system shaft 15.

As a result, the magnitude of the gap in the radial direction of the oil chamber 54 of the squeeze film damper 53 increases and decreases in response to vibration, in the radial direction, of the outer race 46 of the rear first bearing 14, and the bearing retaining member 44 is damped with a resistance force generated by flow and compression of viscous oil of the squeeze film within the oil chamber 54, thus preventing the vibration from being transmitted from the bearing retaining member 44 to the inner casing 12.

When the squeeze film damper 53 exhibits a damping effect, oil that has absorbed vibrational energy generates heat and its temperature rises, the oil having risen in temperature is discharged in succession from the abutment clearance of the seal rings 55 of the squeeze film damper 53, and fresh oil is supplied from the oil pump, thus maintaining the damping function of the squeeze film damper 53.

When the centrifugal whirling of the sleeve 41, which is the rotating shaft of the gas turbine engine, has forward mode characteristics and the sleeve 41 undergoes centrifugal whirling in the same direction as the direction of rotating, it is possible by imparting anisotropy to the dynamic characteristics distribution of the oil film of the squeeze film damper 53, to weaken the forward mode tendency and suppress the centrifugal whirling, thereby damping the vibration transmitted from the sleeve 41 to the bearing retaining member 44.

That is, since the two recess portions 44a formed in the bearing retaining member 44 face the annular oil chamber 54 of the squeeze film damper 53 formed between the outer periphery of the outer race 46 of the rear first bearing 14 and the inner periphery of the bearing retaining member 44, the film thickness of the oil film of the squeeze film increases locally in the area of the recess portions 44a, and the oil film dynamic characteristics of a part where the film thickness is large becomes more flexible than the oil film dynamic characteristics of a part where the film thickness is small, thus introducing anisotropy in the peripheral direction to the dynamic characteristics distribution of the squeeze film.

Since a squeeze film having anisotropy promotes the backward mode tendency, the forward mode tendency inherently possessed by the gas turbine engine is counteracted by the backward mode tendency, thereby suppressing the centrifugal whirling of the sleeve 41 and enhancing the damping effect of the squeeze film damper 53. Moreover, since the squeeze film damper 53 of the present embodiment can enhance the damping effect merely by making the film thickness of the oil film of the squeeze film non-uniform in the peripheral direction, its structure is simple and it can be realized at low cost.

Second Embodiment

Figure 4A:
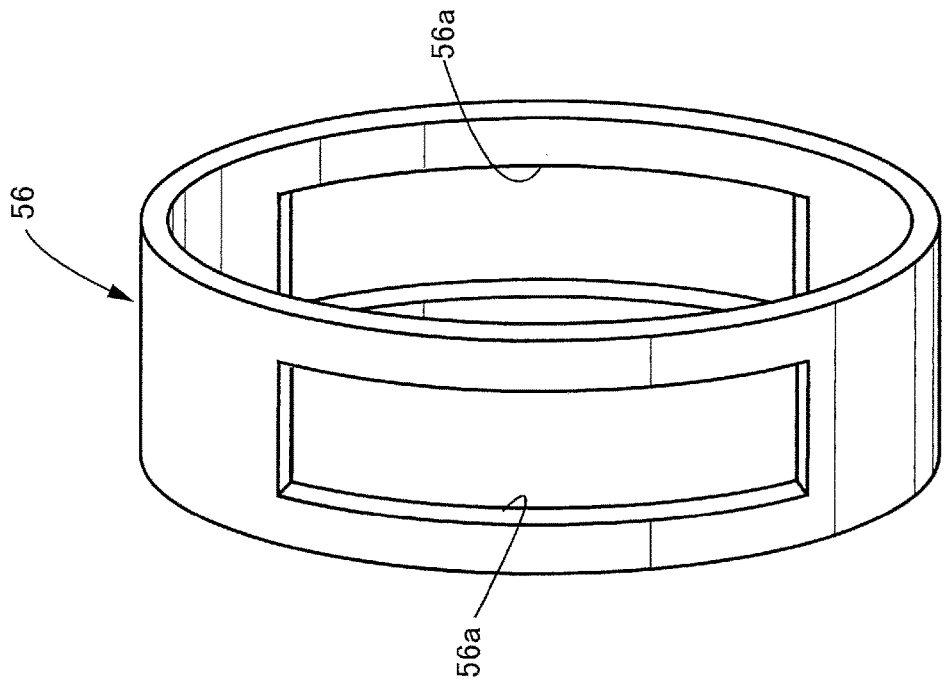
FIGS. 4A and 4B are views corresponding to FIG. 2 (second embodiment).
Figure 4B:
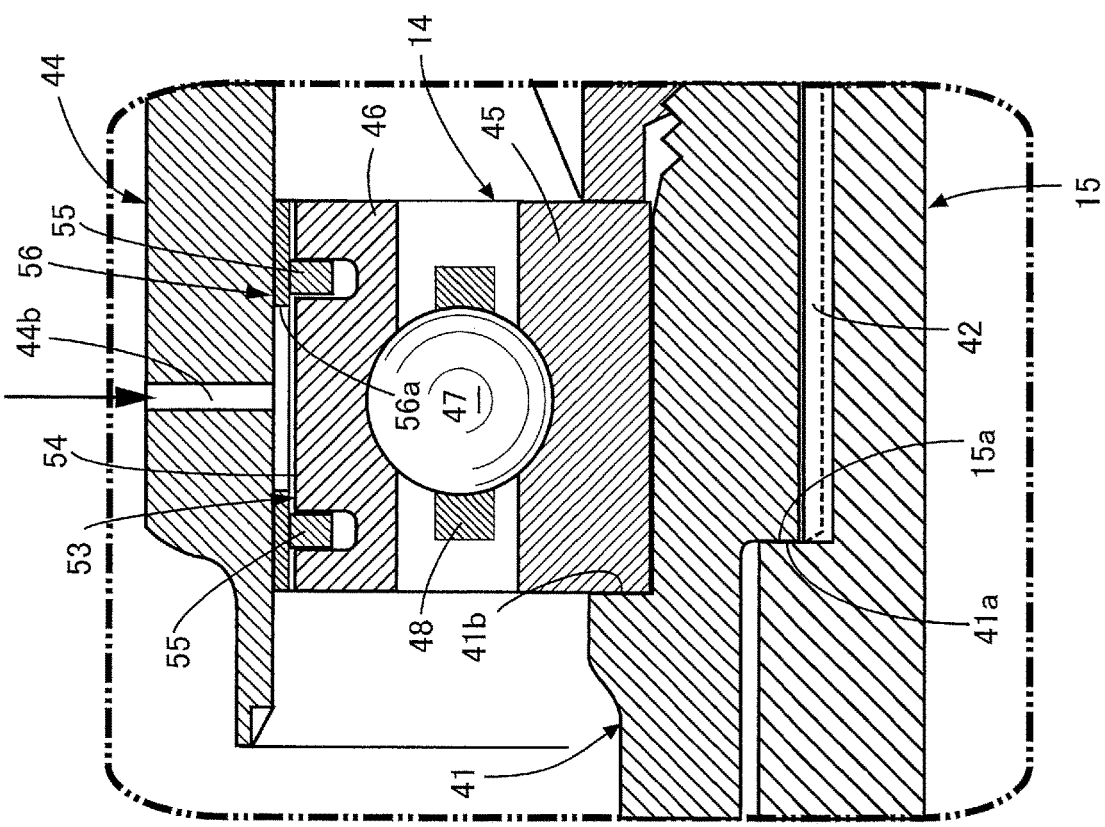

A second embodiment of the present invention is now explained by reference to FIGS. 4A and 4B.

In the first embodiment the recess portions 44a are formed by machining the inner periphery of the bearing retaining member 44, but in a second embodiment a ring member 56 as a separate member is fixed to the inner periphery of the bearing retaining member 44 by press fitting, and two recess portions 56a are formed so as to extend through positions of the ring member 56 having a phase difference of 180°. A pair of seal rings 55 provided on the outer race 46 abut against the inner periphery of the ring member 56 to thus define an oil chamber 54. This enables the film thickness of an oil film to be increased locally in the area of the recess portions 56a, thus imparting anisotropy in the peripheral direction to the film thickness of the oil film of the oil chamber 54.

In accordance with the present embodiment, it is possible to eliminate machining of the inner periphery of the bearing retaining member 44, which increases the cost, and the recess portions 56a facing the oil chamber 54 can easily be formed.

Third Embodiment

A third embodiment of the present invention is now explained by reference to FIGS. 5A and 5B.

In the first embodiment the recess portions 44a are formed by machining the inner periphery of the bearing retaining member 44, but in a third embodiment a ring member 56 as a separate member is fixed to the inner periphery of the bearing retaining member 44 by press fitting, and two projecting portions 56b are formed so as to project inwardly in the radial direction from positions of the ring member 56 having a phase difference of 180°. Oil holes 56c for supplying oil to an oil chamber 54 are formed in the ring member 56. A pair of seal rings 55 provided on the outer race 46 abut against the inner periphery of the ring member 56 to thus define the oil chamber 54. This enables the film thickness of an oil film to be locally decreased in the area of the projecting portions 56b, thus imparting anisotropy in the peripheral direction to the film thickness of the oil film of the oil chamber 54.

Fourth Embodiment

A fourth embodiment of the present invention is now explained by reference to FIGS. 6A and 6B.

A ring member 56 of the fourth embodiment has a shape similar to that of the ring member 56 of the second embodiment, but the ring member 56 is not press fitted into the inner periphery of the bearing retaining member 44 but is inserted into the oil chamber 54 in a floating state. The film thickness of an oil film decreases locally in the area of recess portions 56a of the ring member 56, thus imparting anisotropy in the peripheral direction to the film thickness of the oil film of the oil chamber 54.

In accordance with the present embodiment, since it is unnecessary to press fit the ring member 56 into the inner periphery of the bearing retaining member 44, the assembly cost can be further reduced.

In addition, in the fourth embodiment, the same effects can be achieved by forming the projecting portions 56b (see FIGS. 5A and 5B) on the ring member 56 as from forming the recess portions 56a in the ring member 56.

Fifth Embodiment

A fifth embodiment of the present invention is now explained by reference to FIGS. 7A and 7B.

A gas turbine engine of the fifth embodiment is of a stationary type and is fixed to the ground in a fixed attitude with axes of a low pressure system shaft 15 and a sleeve 41 horizontal. A pair of recess portions 44a formed in the inner periphery of a bearing retaining member 44 are either disposed on opposite sides in the vertical direction of a rotating shaft as shown in FIG. 7A or disposed on opposite sides in the horizontal direction of the rotating shaft as shown in FIG. 7B.

When forward mode centrifugal whirling is occurring in the rotating shaft, the damping effect can be enhanced by increasing the anisotropy of the film thickness of the oil film, and conversely when backward mode centrifugal whirling is occurring, the damping effect can be enhanced by increasing the isotropy of the film thickness of the oil film.

Figure 7A:
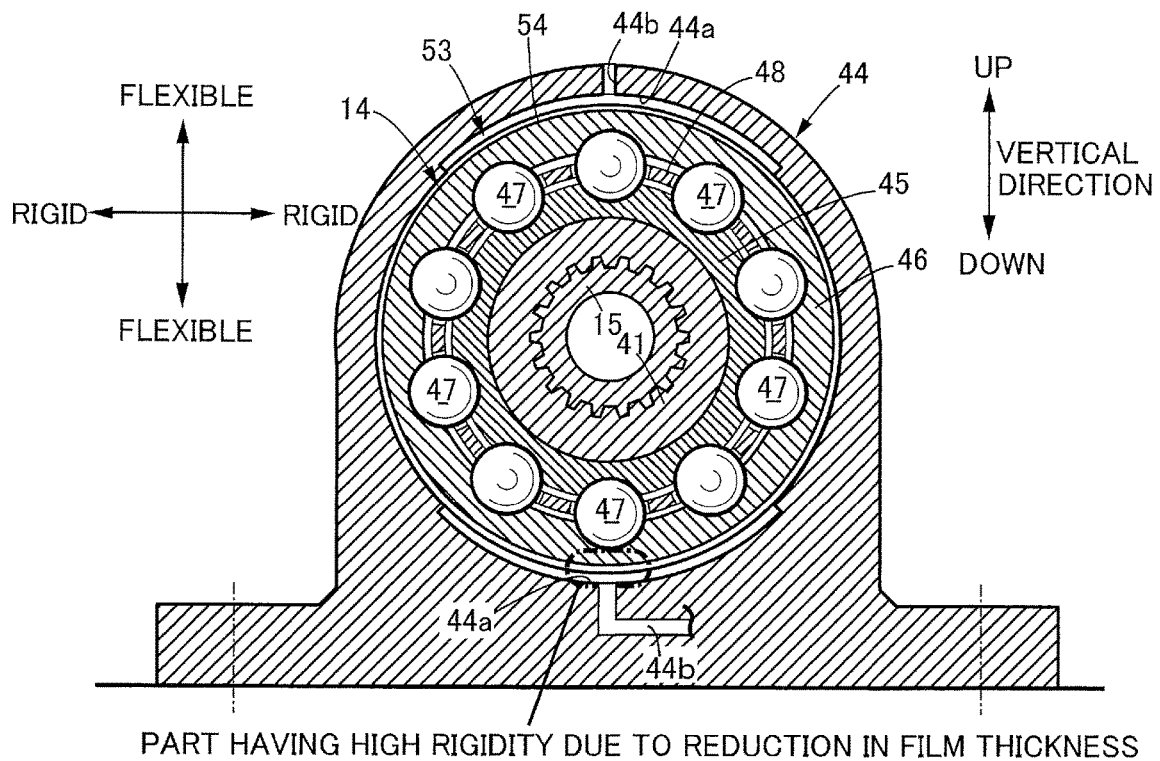
FIGS. 7A and 7B are views corresponding to FIG. 3 (fifth embodiment).
Figure 7B:
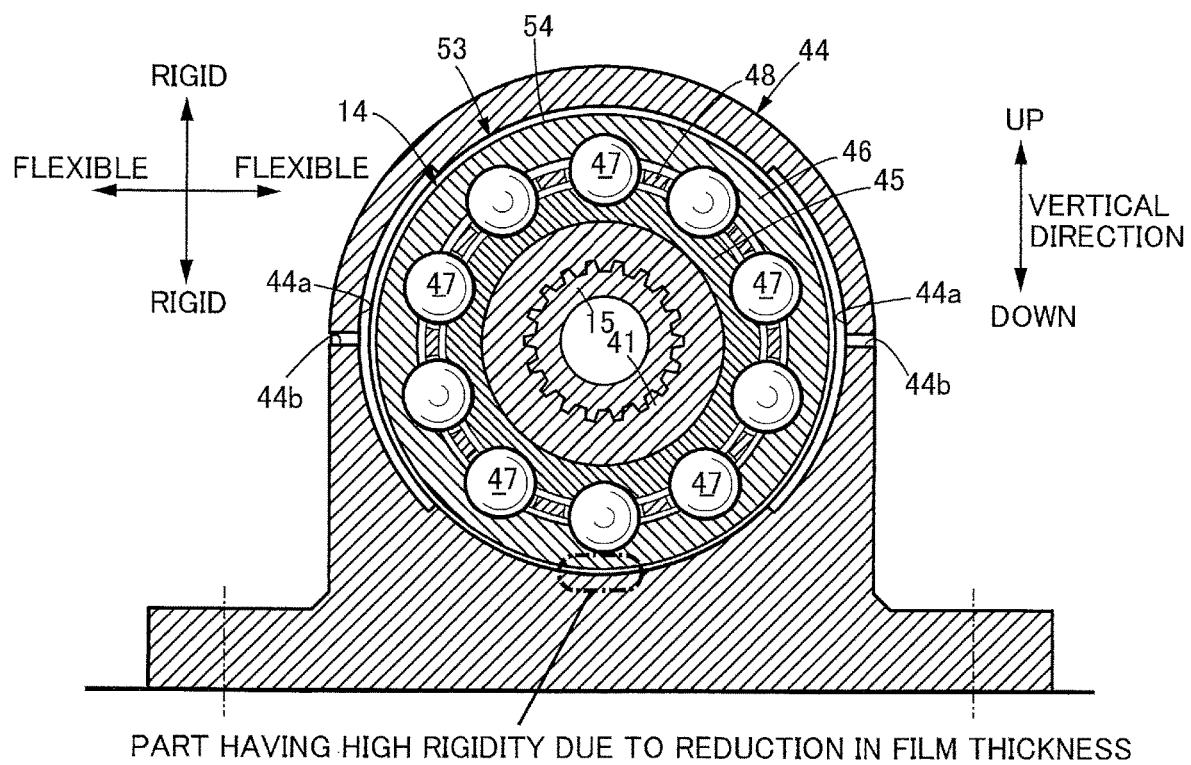

Due to the structure of the base, the gas turbine engine of the present embodiment shown in FIGS. 7A and 7B often has a support having high anisotropy in which the stiffness in the vertical direction is high and the stiffness in the horizontal direction is low. When a strong backward mode is a problem, as shown in FIG. 7A the two recess portions 44a are disposed on opposite sides in the vertical direction to thus impart flexibility to the dynamic characteristics in the vertical direction of the oil film and impart rigidity to the dynamic characteristics in the horizontal direction, thereby enhancing the overall isotropy of the film thickness of the oil film and enhancing the damping effect.

Conversely, when a strong forward mode is a problem, as shown in FIG. 7B the two recess portions 44a are disposed on opposite sides in the horizontal direction to thus impart flexibility to the dynamic characteristics in the horizontal direction of the oil film and impart rigidity to the dynamic characteristics in the vertical direction, thereby enhancing the overall anisotropy of the film thickness of the oil film and enhancing the damping effect of the forward mode.

Embodiments of the present invention are explained above, but the present invention may be modified in a variety of ways as long as the modifications do not depart from the gist of the present invention.

For example, the target to which the present invention is applied is not limited to the rear first bearing 14 of the gas turbine engine of the embodiments; application thereof is possible to other bearings of a gas turbine engine, and application thereof is also possible to a bearing for any purpose other than a gas turbine engine.

Furthermore, the rear first bearing 14 of the embodiments is a ball bearing, but it may be another type of bearing such as a roller bearing or a needle bearing.

Moreover, the squeeze film damper 53 of the embodiments is equipped with the two recess portions 44*a* or 56*a* or the two projecting portions 56*b*, but the number of recess portions or projecting portions may be one or three or more. When the number of recess portions or projecting portions is two as in the embodiments, the effect of adjusting the isotropy or anisotropy is the highest.

What is claimed is:

1. A bearing device comprising an inner race fitted around an outer periphery of a rotating shaft, an outer race supported on an inner periphery of a bearing retaining member via a squeeze film damper, and a plurality of rolling bodies disposed between the inner race and the outer race, the squeeze film damper comprising an annular oil chamber forming an oil film between an outer periphery of the outer race and the inner periphery of the bearing retaining member, and a film thickness adjustment portion adjusting a film thickness of the oil film being provided in at least one location in a circumferential direction of the oil chamber, wherein the film thickness adjustment portion is a recess portion formed on a ring member disposed in an interior of the oil chamber in a floating state.

2. The bearing device according to claim 1, wherein the film thickness adjustment portion is provided in two locations, spaced by 180° in the circumferential direction, of the oil chamber.

3. The bearing device according to claim 2, wherein the rotating shaft is disposed in a horizontal direction, and the film thickness adjustment portion is provided in two locations spaced in a vertical direction of the oil chamber or in two locations spaced in the horizontal direction.

4. The bearing device according to claim 2, wherein the rotating shaft is disposed in a horizontal direction, and the film thickness adjustment portion is provided in two locations spaced in the horizontal direction.

5. The bearing device according to claim 1, wherein the recess portion of the film thickness adjustment portion extends entirely through the ring member.

* * * * *